(12) United States Patent
Kato (10) Patent No.: US 12,465,722 B2
(45) Date of Patent: Nov. 11, 2025

(54) REINFORCED CATHETER WITH TAPERED PROXIMAL LUMEN

(71) Applicant: KANEKA CORPORATION, Osaka (JP)

(72) Inventor: Tomoya Kato, Settsu (JP)

(73) Assignee: KANEKA CORPORATION, Osaka (JP)

( * ) Notice: Subject to any disclaimer, the term of this patent is extended or adjusted under 35 U.S.C. 154(b) by 1001 days.

(21) Appl. No.: 17/619,303

(22) PCT Filed: Jun. 4, 2020

(86) PCT No.: PCT/JP2020/022151
§ 371 (c)(1),
(2) Date: Dec. 15, 2021

(87) PCT Pub. No.: WO2020/255736
PCT Pub. Date: Dec. 24, 2020

(65) Prior Publication Data
US 2022/0096791 A1    Mar. 31, 2022

(30) Foreign Application Priority Data
Jun. 19, 2019   (JP) .................. 2019-114064

(51) Int. Cl.
*A61M 25/00* (2006.01)
*A61M 25/01* (2006.01)

(52) U.S. Cl.
CPC .... *A61M 25/0052* (2013.01); *A61M 25/0071* (2013.01); *A61M 25/0136* (2013.01)

(58) Field of Classification Search
CPC .......... A61M 25/0014; A61M 25/0097; A61M 2025/0098; A61M 25/005–0053
See application file for complete search history.

(56) References Cited

U.S. PATENT DOCUMENTS 4,781,703 A * 11/1988 Walker .............. A61M 25/0014
604/533
4,802,947 A *  2/1989 Bartholomew ... B29C 66/73143
156/380.8

(Continued)

FOREIGN PATENT DOCUMENTS

EP             356774 A1 *  8/1989 ............ A61M 25/00
JP         2017-93868 A    6/2017
WO    WO 2018/169030 A1    9/2018

OTHER PUBLICATIONS

International Search Report, issued in PCT/JP2020/022151, dated Aug. 11, 2020.

(Continued)

*Primary Examiner* — Bhisma Mehta
*Assistant Examiner* — Adam J. Cermak
(74) *Attorney, Agent, or Firm* — Birch, Stewart, Kolasch & Birch, LLP

(57) ABSTRACT

The catheter of the present invention includes a tubular member having a reinforced portion and an unreinforced portion having a tapered portion; and a handle connected to a proximal end portion of the tubular member; wherein the handle has a first lumen and a second lumen positioned proximally beyond the first lumen, the unreinforced portion is fixed to the first lumen with a proximal end of the unreinforced portion positioned at the proximal end of the first lumen, and the catheter satisfies formulae (1) to (3):

$$a < b \quad (1)$$
$$a < c \quad (2)$$
$$b \geq c \quad (3),$$

where a is an inner diameter at a position apart by 1 mm distally from a proximal end of the reinforced portion, (Continued)

b is an inner diameter at the proximal end of the unreinforced portion, and c is an inner diameter at the distal end of the second lumen of the handle.

14 Claims, 4 Drawing Sheets

(56) References Cited

U.S. PATENT DOCUMENTS

| | | | | |
|---|---|---|---|---|
| 4,806,182 A * | 2/1989 | Rydell | ............ | B29C 66/71 |
| | | | | 156/303.1 |
| 4,838,873 A * | 6/1989 | Landskron | ........ | A61M 25/0014 |
| | | | | 604/905 |
| 5,156,792 A * | 10/1992 | Holdaway | ......... | A61M 25/0014 |
| | | | | 604/164.11 |
| 5,830,189 A * | 11/1998 | Chang | ............ | A61M 39/10 |
| | | | | 604/533 |
| 5,830,401 A * | 11/1998 | Prichard | ........... | A61M 25/0014 |
| | | | | 264/261 |
| 6,130,406 A * | 10/2000 | Cheer | ................ | B29C 73/30 |
| | | | | 219/121.72 |
| 6,355,027 B1 * | 3/2002 | Le | ...................... | A61M 25/0054 |
| | | | | 604/525 |
| 6,575,959 B1 * | 6/2003 | Sarge | ............... | A61M 25/0014 |
| | | | | 604/533 |
| 7,455,325 B2 * | 11/2008 | Mejlhede | ............. | F16L 47/00 |
| | | | | 285/285.1 |
| 7,608,063 B2 * | 10/2009 | Le | ...................... | A61M 25/008 |
| | | | | 604/264 |
| 7,662,144 B2 * | 2/2010 | Chan | ................ | A61M 25/0009 |
| | | | | 604/533 |
| 7,713,260 B2 * | 5/2010 | Lessard | ............ | A61M 25/0009 |
| | | | | 604/533 |
| 8,152,791 B2 * | 4/2012 | Goode | ............. | A61M 39/0208 |
| | | | | 604/535 |
| 9,895,513 B2 * | 2/2018 | Kawaguchi | ....... | A61M 25/0028 |
| 10,946,167 B2 * | 3/2021 | Mintz | ............... | A61M 25/0097 |
| 10,953,196 B2 * | 3/2021 | Raab | ............... | A61M 25/0097 |
| 2004/0204691 A1 * | 10/2004 | Yashiro | ............. | A61M 25/0606 |
| | | | | 604/257 |
| 2006/0264904 A1 * | 11/2006 | Kerby | ............... | A61M 25/0043 |
| | | | | 604/523 |
| 2007/0197956 A1 * | 8/2007 | Le | ....................... | A61M 25/008 |
| | | | | 604/890.1 |
| 2009/0036836 A1 * | 2/2009 | Nystrom | ........... | A61M 39/0606 |
| | | | | 604/533 |
| 2015/0265806 A1 * | 9/2015 | Kawaguchi | ....... | A61M 25/0028 |
| | | | | 604/539 |
| 2016/0317799 A1 * | 11/2016 | Tohse | ............... | A61B 17/12186 |
| 2017/0035996 A1 * | 2/2017 | O'Fallon | ........... | A61M 25/0097 |
| 2017/0043060 A1 * | 2/2017 | Wang | ..................... | A61L 29/02 |
| 2017/0151417 A1 * | 6/2017 | Takemura | ............. | A61M 25/09 |
| 2017/0340860 A1 * | 11/2017 | Eberhardt | ........... | B29C 65/1412 |
| 2019/0275294 A1 * | 9/2019 | Trösken | ............. | A61M 25/0097 |
| 2019/0358433 A1 * | 11/2019 | Yokota | .............. | A61M 25/0097 |
| 2019/0381275 A1 * | 12/2019 | Mintz | ............... | A61M 25/0014 |
| 2020/0121896 A1 * | 4/2020 | Baid | ............. | A61M 25/0606 |
| 2021/0138200 A1 * | 5/2021 | Chong | ............. | A61M 25/0606 |
| 2021/0402143 A1 * | 12/2021 | Yokota | .................. | A61M 39/22 |

OTHER PUBLICATIONS

Written Opinion of the International Searching Authority, issued in PCT/JP2020/022151, dated Aug. 11, 2020.

* cited by examiner

Fig. 9

REINFORCED CATHETER WITH TAPERED PROXIMAL LUMEN

TECHNICAL FIELD

The present invention relates to a catheter and a method of producing the catheter.

BACKGROUND ART

There has been used a catheter configured to be inserted to a blood vessel or the like for examination or treatment of a lesion of a human body. Examples of such a catheter include a catheter assembly disclosed in Patent Document 1. The catheter assembly includes an elongate flexible tubular shaft having a lumen extending longitudinally, a polymeric tubular sleeve covering at least a proximal portion of an outer surface of the tubular shaft and extending proximally, and a hub disposed around the tubular shaft and covering at least the polymeric tubular sleeve.

RELATED ART DOCUMENT

Patent Document

Patent Document 1: U.S. Pat. No. 6,575,959

SUMMARY OF THE INVENTION

Problems to be Solved by the Invention

According to Patent Document 1, when the catheter including the hub serving as a handle is produced by injection molding, the tubular shaft is covered with the polymeric tubular sleeve in order to protect the tubular shaft from heat generated in an injection molding process. In an exemplary case where the tubular shaft is covered with the polymeric tubular sleeve such that the polymeric tubular sleeve extends proximally beyond a proximal end of the tubular shaft as depicted in FIG. 1 of Patent Document 1, the proximal end of the tubular shaft is more likely to be protected from the heat. However, when a guide wire or the like is inserted distally from a proximal side, a tip end of the guide wire or the like is possibly caught by the proximal end of the tubular shaft in a lumen of the polymeric tubular sleeve. In another case where the tubular shaft is covered with the polymeric tubular sleeve such that the proximal end of the tubular shaft matches a proximal end of the polymeric tubular sleeve, the proximal end of the tubular shaft is inadequately protected and is likely to have unevenness or the like due to fusion, degeneration, or the like caused by heat or the like generated in the injection molding process, which may lead to difficulty in insertion of the wire.

The present invention has been achieved in view of the above problems, and an object of the present invention is to provide a catheter that facilitates insertion of a wire from a handle, and a method of producing the catheter.

Solutions to the Problems

The present invention provides a catheter that successfully solves the above problems and has the following configuration.

[1] A catheter including;
a tubular member extending in a longitudinal direction and having a distal end and a proximal end; and
a handle connected to a proximal end portion of the tubular member; wherein
the tubular member has a reinforced portion including a reinforcing member, and an unreinforced portion positioned proximally beyond the reinforced portion and including no reinforcing member,
the unreinforced portion has a tapered portion proximally increased in inner diameter,
the handle has a first lumen and a second lumen positioned proximally beyond the first lumen,
the first lumen has a proximal end larger in inner diameter than a distal end of the second lumen,
the unreinforced portion is fixed to the first lumen with a proximal end of the unreinforced portion positioned at the proximal end of the first lumen, and the catheter satisfies formulae (1) to (3);

$$a < b \tag{1}$$

$$a < c \tag{2}$$

$$b \geq c \tag{3},$$

where a is an inner diameter (mm) at a position apart by 1 mm distally from a proximal end of the reinforced portion of the tubular member, b is an inner diameter (mm) at the proximal end of the unreinforced portion of the tubular member, and c is an inner diameter (mm) at the distal end of the second lumen of the handle.

In a catheter that includes a tubular member having a reinforced portion including a reinforcing member, and a handle (hub) having a first lumen and a second lumen positioned proximally beyond the first lumen, the first lumen having a proximal end larger in inner diameter than a distal end of the second lumen, when an unreinforced portion is provided to be positioned proximally beyond the reinforced portion, includes no reinforcing member, and has a tapered portion proximally increased in inner diameter, the unreinforced portion is fixed to the first lumen such that a proximal end of the unreinforced portion is positioned at the proximal end of the first lumen, and the catheter satisfies the formulae (1) to (3), the catheter then facilitates insertion of a wire from the handle.

The catheter according to the present invention is preferred to further include configurations [2] to [13] described below. The present invention further includes a method of producing a catheter as in [14] described below.

[2] The catheter according to above [1], wherein the second lumen of the handle has a tapered portion distally reduced in diameter.

[3] The catheter according to above [1] or [2], further including a resin sleeve, the sleeve covering an outer surface of a proximal end portion of the reinforced portion and extending proximally to constitute the tapered portion of the unreinforced portion.

[4] The catheter according to above [3], wherein an axial length from the proximal end of the reinforced portion to a distal end of the sleeve is twice or more and 35 times or less the inner diameter a at the position apart by 1 mm distally from the proximal end of the reinforced portion of the tubular member.

[5] The catheter according to above [3] or [4], wherein the sleeve contains a thermoplastic resin.

[6] The catheter according to above [5], wherein the thermoplastic resin is at least one selected from a group consisting of polyethylene, polyamide elastomer, polyamide, and polyurethane.

[7] The catheter according to any one of above [1] to [6], wherein the proximal end portion of the tubular member is fixed to the first lumen by an adhesive.

[8] The catheter according to above [7], wherein the adhesive is at least one selected from a group consisting of a cyanoacrylate adhesive, an acrylic adhesive, an epoxy adhesive, and a urethane adhesive.

[9] The catheter according to any one of above [1] to [8], further including
an outer tubular member having an inner diameter larger than an outer diameter of the tubular member, extending in the longitudinal direction, and having a distal end and a proximal end, wherein
the outer tubular member has a lumen provided with the tubular member.

[10] The catheter according to above [9], wherein the proximal end of the outer tubular member is positioned distally beyond the proximal end of the reinforced portion.

[11] The catheter according to any one of above [1] to [10], wherein the reinforcing member is a braided body made of braided wires, or a coil made of a spirally wound wire.

[12] The catheter according to any one of above [1] to [11], wherein the reinforced portion includes an inner layer and an outer layer, and the reinforcing member is interposed between the inner layer and the outer layer.

[13] The catheter according to above [12], wherein the outer layer contains at least one selected from a group consisting of polyethylene, polyamide elastomer, polyamide, and polyurethane.

[14] A method of producing a catheter, the method including:
covering a first end portion of a tubular body including a reinforcing member with a first end portion of a resin sleeve; and
heating a metal body having a tapered portion and inserting the metal body from a second end portion of the resin sleeve toward the first end portion.

Effects of the Invention

The present invention provides a catheter that facilitates insertion of a wire from a handle, and a method of producing the catheter.

MODE FOR CARRYING OUT THE INVENTION

More specific description will now be made to the following embodiment of the present invention. The present invention should not be limited by the following embodiment but can obviously be implemented with appropriate modifications within a range applicable to purport of the above and below description. Such modifications will be all included in the technical scope of the present invention. Some of the drawings may not include reference signs of members for convenience, in which case the specification or any other appropriate drawing should be referred to. Various members in the drawings may not be depicted in actual sizes, because contribution to comprehension of the features of the present invention is prioritized in the drawings.

The present invention provides a catheter including: a tubular member extending in a longitudinal direction and having a distal end and a proximal end; and a handle connected to a proximal end portion of the tubular member; in which the tubular member has a reinforced portion including a reinforcing member, and an unreinforced portion positioned proximally beyond the reinforced portion and including no reinforcing member, the unreinforced portion has a tapered portion proximally increased in inner diameter, the handle has a first lumen and a second lumen positioned proximally beyond the first lumen, the first lumen has a proximal end larger in inner diameter than a distal end of the second lumen, the unreinforced portion is fixed to the first lumen with a proximal end of the unreinforced portion positioned at the proximal end of the first lumen, and the catheter satisfies formulae (1) to (3):

$$a < b \quad (1)$$

$$a < c \quad (2)$$

$$b \geq c \quad (3)$$

[where a is an inner diameter (mm) at a position apart by 1 mm distally from a proximal end of the reinforced portion of the tubular member, b is an inner diameter (mm) at the proximal end of the unreinforced portion of the tubular member, and c is an inner diameter (mm) at the distal end of the second lumen of the handle.]

The inventor of the present invention has diligently investigated a structure of a catheter facilitating insertion of a wire, the catheter including a tubular member having a reinforced portion including a reinforcing member, and a handle (hub) having a first lumen and a second lumen positioned proximally beyond the first lumen, the first lumen having a proximal end larger in inner diameter than a distal end of the second lumen. The inventor has eventually found that the catheter facilitates insertion of a wire from the handle when an unreinforced portion is provided to be positioned proximally beyond the reinforced portion, the unreinforced portion includes no reinforcing member and has a tapered portion proximally increased in inner diameter, the unreinforced portion is fixed to the first lumen such that a proximal end of the unreinforced portion is positioned at the proximal end of the first lumen, and the catheter satisfies the formulae (1) to (3).

Conventionally, a guide wire has been occasionally used as a wire to be inserted to a catheter, the guide wire having a tip end portion preliminarily bent to be angled in order for search for an entrance or the like of a stenosed part in a blood vessel, selection of a blood vessel, or direction control of a distal end of the catheter. In such a tip-end bent wire, the tip end has large moving resistance due to likelihood of contact with an inner wall of the handle (hub) or an inner wall of the tubular member, and is likely to be caught by an uneven portion, a stepped portion, and the like. The configuration according to the present invention facilitates insertion of the tip-end bent wire having insertion difficulty.

Figure 1:
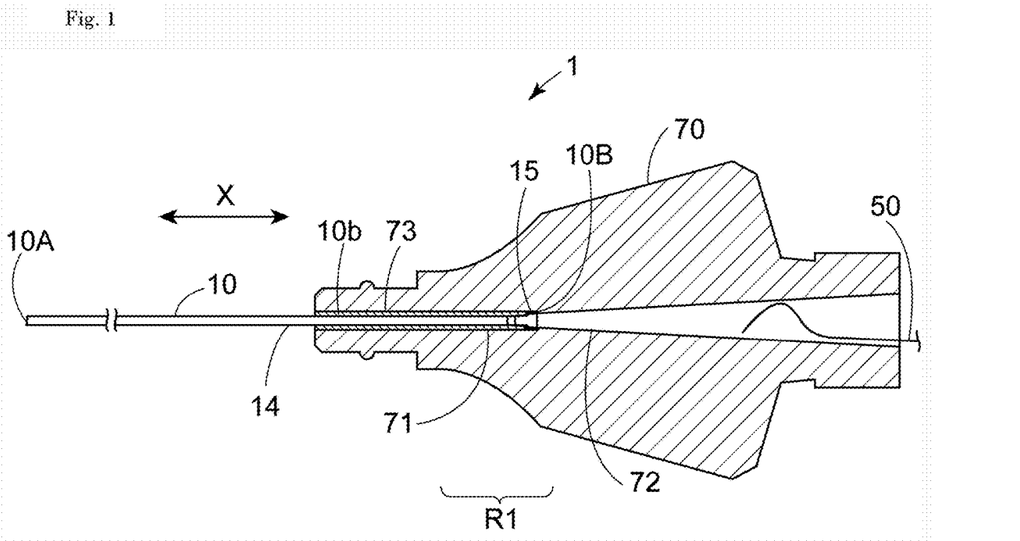
FIG. 1 is a sectional view of a catheter according to an embodiment.
Figure 2:
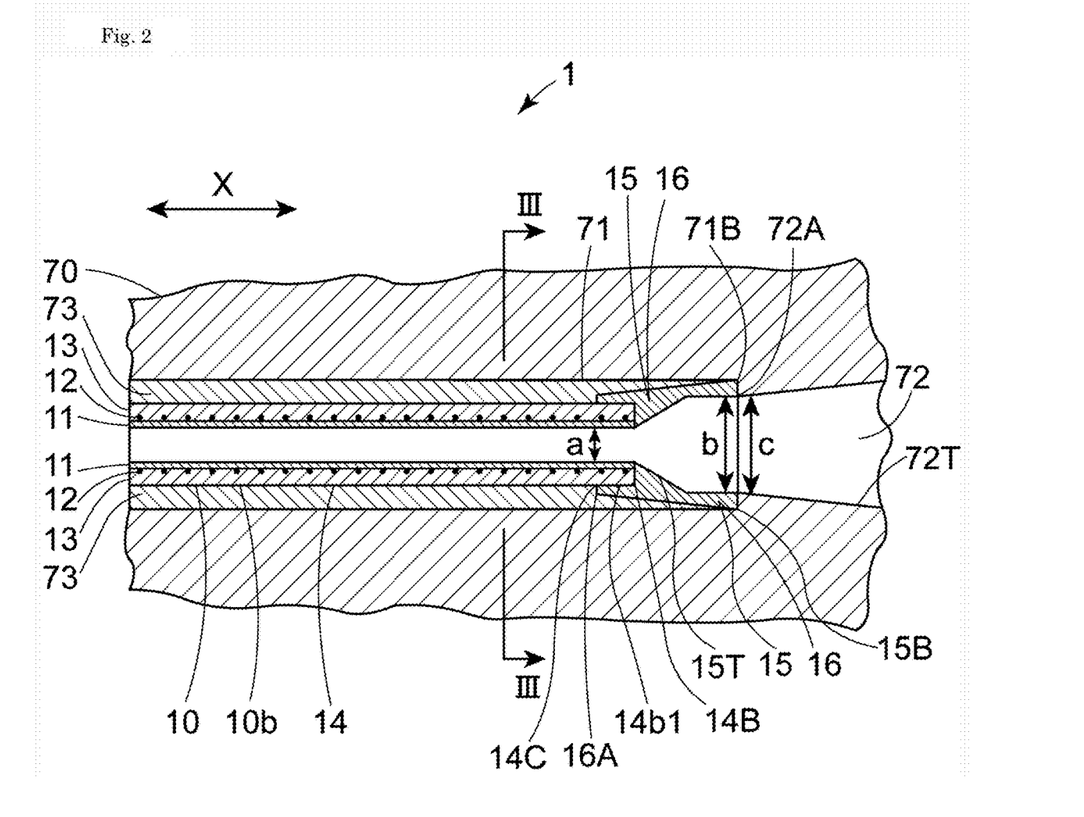
FIG. 2 is a partial enlarged view of a region R1 indicated in FIG. 1.
Figure 3:
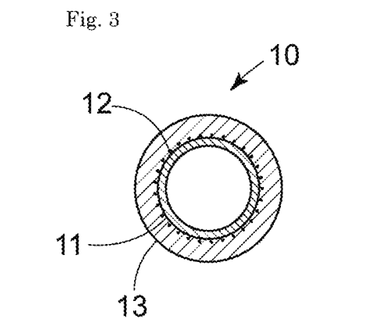
FIG. 3 is a sectional view taken along line III-III indicated in FIG. 2.

Description is made hereinafter to a catheter according to an embodiment of the present invention with reference FIGS. 1 to 3. FIG. 1 is a sectional view of the catheter according to the embodiment. FIG. 2 is a partial enlarged view of a region R1 indicated in FIG. 1. FIG. 3 is a sectional view taken along line III-III indicated in FIG. 2.

As depicted in FIG. 1, a catheter 1 according to the embodiment includes a tubular member 10 extending in a longitudinal direction X and having a distal end 10A and a proximal end 10B, and a handle 70 connected to a proximal end portion 10b of the tubular member 10.

As depicted in FIG. 2, the tubular member 10 has a reinforced portion 14 including a reinforcing member 12, and an unreinforced portion 15 positioned proximally beyond the reinforced portion 14 and including no reinforcing member 12. Furthermore, the unreinforced portion 15 has a tapered portion 15T proximally increased in inner diameter.

The handle 70 has a first lumen 71 and a second lumen 72 positioned proximally beyond the first lumen 71. The first lumen 71 has a proximal end 71B larger in inner diameter than a distal end 72A of the second lumen 72. Furthermore, the unreinforced portion 15 is fixed to the first lumen 71 such that a proximal end 15B of the unreinforced portion 15 is positioned at the proximal end 71B of the first lumen 71. The unreinforced portion 15 of the tubular member 10 is disposed in the first lumen 71, and the second lumen 72 communicates with the unreinforced portion 15 and a lumen of the reinforced portion 14. Moreover, the catheter 1 satisfies the following formulae (1) to (3) in order to facilitate insertion of a wire from the second lumen 72 to a lumen of the tubular member 10.

$$a<b \qquad (1)$$

[where a is an inner diameter (mm) at a position 14C apart by 1 mm distally from a proximal end 14B of the reinforced portion 14 of the tubular member 10, and b is an inner diameter (mm) at the proximal end 15B of the unreinforced portion 15 of the tubular member 10.]

The inner diameter b (mm) at the proximal end 15B of the unreinforced portion 15 is larger than the inner diameter a (mm) at the position 14C apart by 1 mm distally from the proximal end 14B of the reinforced portion 14, so that the unreinforced portion 15 is proximally increased in diameter. The lumen of the tubular member 10 can thus easily receive a wire from a proximal side. Accordingly, the inner diameter b is preferably 1.1 times or more the inner diameter a, more preferably 1.2 times or more, and further preferably 1.3 times or more. The inner diameter b is not particularly limited in terms of its upper limit. For example, the inner diameter b may be ten times or less, five times or less, or two times or less the inner diameter a. The inner diameter a (mm) is preferably 0.1 mm or more and 0.8 mm or less, and more preferably 0.3 mm or more and 0.55 mm or less.

$$a<c \qquad (2)$$

[where a is an inner diameter (mm) at the position 14C apart by 1 mm distally from the proximal end 14B of the reinforced portion 14 of the tubular member 10, and c is an inner diameter (mm) at the distal end 72A of the second lumen 72 of the handle 70.]

The inner diameter c (mm) at the distal end 72A of the second lumen 72 of the handle 70 is larger than the inner diameter a (mm) at the position 14C apart by 1 mm distally from the proximal end 14B of the reinforced portion 14 of the tubular member 10, enabling reduction in moving resistance of a wire due to contact with an inner wall adjacent to the distal end 72A of the second lumen 72. If the inner diameter c is small, a bent portion of a tip-end bent wire 50 to be inserted may be fully extended when passing the distal end 72A of the second lumen 72. Such problematic full extension can be avoided when the inner diameter c is larger than the inner diameter a. Accordingly, the inner diameter c is preferably 1.1 times or more the inner diameter a, more preferably 1.2 times or more, and further preferably 1.3 times or more. The inner diameter c is not particularly limited in terms of its upper limit. For example, the inner diameter c may be five times or less the inner diameter a, four times or less, or three times or less.

$$b \geq c \qquad (3)$$

[where b is an inner diameter (mm) at the proximal end 15B of the unreinforced portion 15 of the tubular member 10, and c is an inner diameter (mm) at the distal end 72A of the second lumen 72 of the handle 70.]

The inner diameter b (mm) at the proximal end 15B of the unreinforced portion 15 is equal to or more than the inner diameter c (mm) at the distal end 72A of the second lumen 72 of the handle 70, so that a wire being inserted distally from the proximal side is less likely to be caught by the proximal end 15B of the unreinforced portion 15. Accordingly, the inner diameter b is preferably 1.1 times or more the inner diameter c, more preferably 1.2 times or more, and further preferably 1.3 times or more. When the inner diameter b is 2.0 times or less the inner diameter c, a wire being proximally pulled backward is less likely to be caught by the distal end 72A of the second lumen 72. Accordingly, the inner diameter b is preferably 2.0 times or less the inner diameter c, more preferably 1.7 times or less, and further preferably 1.5 times or less.

As depicted in FIGS. 1 and 2, the second lumen 72 of the handle 70 preferably has a tapered portion 72T distally reduced in diameter. When the tip-end bent wire 50 is distally inserted to the tapered portion 72T distally reduced in diameter, the bent portion of the tip-end bent wire 50 is extended to some extent, which facilitates insertion of the tip-end bent wire 50 to the lumen of the tubular member 10.

The tapered portion 72T of the second lumen 72 of the handle 70 has an inner wall preferably slanting at 5 degrees or more and 85 degrees or less from an axial direction of the tubular member 10. The slant angle having 5 degrees or more is likely to cause the bent portion of the tip-end bent wire 50 to be extended to some extent. The slant angle having 85 degrees or less facilitates reduction in moving resistance of the wire due to contact with the inner wall of the tapered portion 72T of the second lumen 72. The slant angle is thus more preferably 70 degrees or less, further preferably 60 degrees or less, and still further preferably 50 degrees or less.

Figure 4:
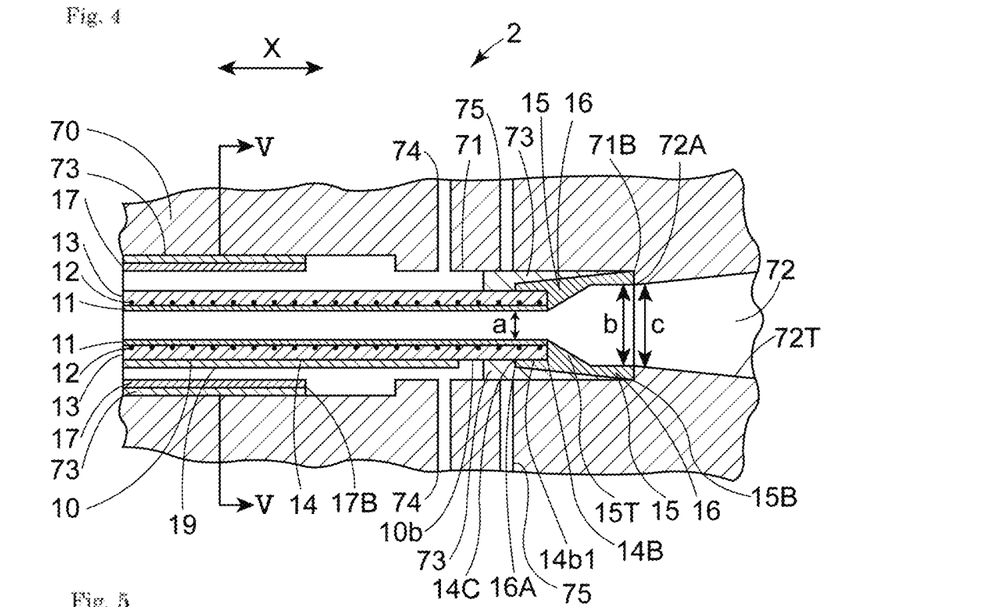
FIG. 4 is a partial enlarged view of a region R2 indicated in FIG. 6.

The first lumen 71 of the handle 70 depicted in FIG. 2 has a cylindrical shape with a substantially constant diameter in the longitudinal direction X. The first lumen 71 may optionally have a stepped portion or the like. As in a catheter 2 according to another embodiment as depicted in FIG. 4 to be described later, the first lumen 71 may have a stepped portion with a larger distal diameter.

The handle 70 preferably has an outer shape allowing a surgeon to grip with fingers. The handle 70 is preferably a resin molded product obtained by injection molding or the like. Examples of a resin include a polyolefin resin such as polyethylene or polypropylene, a polycarbonate resin, and a (meth)acrylic resin. Transparent resins such as polycarbonate and polymethyl methacrylate are preferred among these exemplary resins. This leads to a visible interior of the handle 70 for easier insertion of a wire.

The reinforced portion 14 preferably includes an inner layer 11 and an outer layer 13, as well as the reinforcing member 12 interposed between the inner layer 11 and the outer layer 13.

The inner layer 11 preferably contains at least one selected from a group consisting of a polyamide resin, a polyester resin, a polyurethane resin, a polyolefin resin, a fluororesin, a vinyl chloride resin, a silicone resin, and natural rubber. The inner layer 11 more preferably contains at least one selected from a group consisting of the polyester resin, the polyolefin resin, the fluororesin, the silicone resin, and the natural rubber. Among these, the fluororesin is particularly preferred because of excellent chemical resistance, excellent nonadhesiveness, and excellent low friction.

The outer layer 13 preferably contains at least one selected from a group consisting of polyethylene, polyamide elastomer, polyamide, and polyurethane. Among these, more preferred is at least one selected from a group consisting of polyamide elastomer, polyamide, and polyurethane, and polyurethane is further preferred.

The outer layer 13 preferably contains fine particles in a portion fixed by an adhesive 73 or the like. The outer layer 13 is then more likely to have a slightly uneven surface that is easily fixed by the adhesive 73 or the like. Examples of the fine particles include pigment exemplified by inorganic fine particles, organic fine particles, synthetic inorganic pigment, or the like. The fine particles each have a major diameter preferably having 0.1 µm or more, more preferably 0.5 µm or more, and further preferably 0.8 µm or more. The major diameter is preferably 50 µm or less, more preferably 10 µm or less, and further preferably 5 µm or less.

The outer layer 13 preferably contains a barium salt in a portion positioned in the first lumen 71. Even when the outer layer 13 contains a urethane resin having high tackiness, the proximal end portion 10*b* of the tubular member 10 being inserted to the first lumen 71 is less likely to be caught in a production step by the barium salt. The barium salt is preferably at least one selected from a group consisting of barium sulfate, barium carbonate, barium hydroxide, barium chloride, barium nitrate, and barium acetate, and is more preferably barium sulfate.

The reinforcing member 12 is preferably a braided body made of braided wires, or a coil made of a spirally wound wire. This configuration easily prevents a wire from breaking the tubular member 10. Among these, the reinforcing member 12 is more preferably the braided body that facilitates improvement in rigidity.

Examples of the wire constituting the reinforcing member 12 include metal wire and fiber. The metal wire is preferably made of a material such as stainless steel, titanium, a nickel-titanium alloy, a cobalt-chromium alloy, and a tungsten alloy. Among these, stainless steel is more preferred. The metal wire may include a single wire or a twisted wire. Examples of the fiber include polyarylate fiber, aramid fiber, ultrahigh molecular weight polyethylene fiber, PBO fiber, and carbon fiber. The fiber may be a monofilament or a multifilament.

The reinforcing member 12 may contain a radiopaque substance for easier recognition of the position of the tubular member 10 by X-ray fluoroscopy or the like. Examples of the radiopaque substance include at least one selected from a group consisting of lead, barium, iodine, tungsten, aurum, platinum, iridium, a platinum-iridium alloy, stainless steel, titanium, a cobalt-chromium alloy, palladium, and tantalum.

The unreinforced portion 15 is a portion included in the proximal end portion 10*b* of the tubular member 10 and not provided with the reinforcing member 12. As described earlier, the unreinforced portion 15 has the tapered portion 15T proximally increased in inner diameter. Even when a lumen at a distal end of the tapered portion 15T and a lumen at the proximal end 14B of the reinforced portion 14 form a stepped portion, the tapered portion 15T thus provided guides a tip end of a wire so as to be apart from the stepped portion, so that the tip end of the wire is less likely to be caught.

The tapered portion 15T of the unreinforced portion 15 has an inner wall preferably slanting at 3 degrees or more and 85 degrees or less from the axial direction of the tubular member 10. The slant angle having 3 degrees or more causes the bent portion of the tip-end bent wire 50 depicted in FIG. 1 or the like to be extended to some extent, and thus facilitates insertion of the tip-end bent wire 50 to the lumen of the tubular member 10. The slant angle having 85 degrees or less facilitates reduction in moving resistance of the wire due to contact with the inner wall of the tapered portion 15T. The slant angle is thus more preferably 70 degrees or less, further preferably 60 degrees or less, still further preferably 50 degrees or less, and particularly preferably 20 degrees or less.

As depicted in FIG. 2, the distal end of the tapered portion 15T proximally increased in inner diameter in the unreinforced portion 15 is preferably positioned at the proximal end 14B of the reinforced portion 14. The unreinforced portion 15 may optionally have a plurality of tapered portions proximally increased in inner diameter. The unreinforced portion 15 preferably has no tapered portion or no stepped portion proximally reduced in inner diameter.

The inner diameter at the distal end of the tapered portion 15T of the unreinforced portion 15 is preferably 0.9 times or more and 1.3 times or less the inner diameter at the proximal end 14B of the reinforced portion 14. The inner diameter being 1.3 times or less achieves reduction of the stepped portion between the lumen at the distal end of the tapered portion 15T and the lumen at the proximal end 14B of the reinforced portion 14, and facilitates distal insertion of a wire. The inner diameter is more preferably 1.2 times or less, and further preferably 1.1 times or less. The inner diameter being 0.9 times or more achieves reduction in resistance due to contact between a wire and the inner wall of the tapered portion 15T of the unreinforced portion 15. The inner diameter is more preferably 1.0 times or more.

As depicted in FIG. 2, the catheter 1 is preferred to further include a resin sleeve 16, covering an outer surface of a proximal end portion 14*b*1 of the reinforced portion 14, and extending proximally to constitute the tapered portion 15T of the unreinforced portion 15. At the proximal end 14B of the reinforced portion 14, the reinforcing member 12 is likely to be deformed outward. Such deformation can be easily prevented by the resin sleeve 16 covering the proximal end portion 14*b*1 of the reinforced portion 14. The resin sleeve 16 has a distal end portion having an inner surface that is preferably coupled to the outer surface of the proximal end portion 14*b*1 of the reinforced portion 14 by heat melting or the like.

An axial length from the proximal end 14B of the reinforced portion 14 to a distal end 16A of the resin sleeve 16 (hereinafter, the axial length is occasionally simply called a coverage length) is preferably twice or more and 35 times or less the inner diameter a at the position 14C apart by 1 mm distally from the proximal end 14B of the reinforced portion 14 of the tubular member 10. The coverage length being twice or more the inner diameter a facilitates prevention of deformation in the proximal end portion 14b1 of the reinforced portion 14. The coverage length is more preferably three times or more the inner diameter a, and further preferably four times or more the inner diameter a. The coverage length being 35 times or less the inner diameter a exerts an anchor effect at the distal end 16A of the resin sleeve 16 to facilitate improvement in durability against axial force when adjacency of the distal end 16A is fixed into the first lumen 71 by the adhesive 73 or the like. The coverage length is thus more preferably 28 times or less the inner diameter a, further preferably 20 times or less the inner diameter a, still further preferably 15 times or less the inner diameter a, and particularly preferably 10 times or less the inner diameter a.

The resin sleeve 16 preferably contains a thermoplastic resin. The thermoplastic resin in the resin sleeve 16 more preferably contains the resin same as the one contained in the outer layer 13.

The thermoplastic resin in the resin sleeve 16 is preferably at least one selected from a group consisting of polyethylene, polyamide elastomer, polyamide, and polyurethane. Among these, more preferred is at least one selected from a group consisting of polyamide elastomer, polyamide, and polyurethane, and polyurethane is further preferred.

The resin sleeve 16 preferably has a tapered outer shape proximally increased in diameter. The resin sleeve 16 is fixed to the second lumen 72 of the handle 70 by the adhesive 73 as depicted in FIG. 2 or the like. The resin sleeve 16 having the tapered outer shape more easily exerts the anchor effect against axial force and is thus less likely to be unfixed.

The adhesive 73 is preferably at least one selected from a group consisting of a cyanoacrylate adhesive, an acrylic adhesive, an epoxy adhesive, and a urethane adhesive, and more preferably is at least one selected from a group consisting of the acrylic adhesive and the urethane adhesive. The urethane adhesive is further preferred because of excellent durability and excellent adhesiveness to a resin. When the handle 70 is formed around the reinforced portion 14 by injection molding, the reinforced portion 14 receives pressure and is likely to be damaged. Such damage by the pressure can be easily avoided when the handle 70 is preliminarily formed and the reinforced portion 14 is fixed into the handle 70 by an adhesive.

The tubular member 10 may optionally be provided with a radiopaque marker. For example, the radiopaque marker is preferably positioned in an area within 50 mm in the longitudinal direction X from the distal end of the tubular member 10. This facilitates recognition of the position of the distal end of the tubular member 10 in an artery. The radiopaque marker is more preferably positioned in an area within 20 mm, and further preferably within 5 mm.

The radiopaque marker is not particularly limited in shape, and examples of the shape include a belt shape and a spiral shape. The radiopaque marker is made of a material exemplified by the radiopaque substance.

The catheter 1 is appropriately used for treatment to expand a stenosed or obstructed part of a passage such as a blood vessel in a body.

Figure 5:
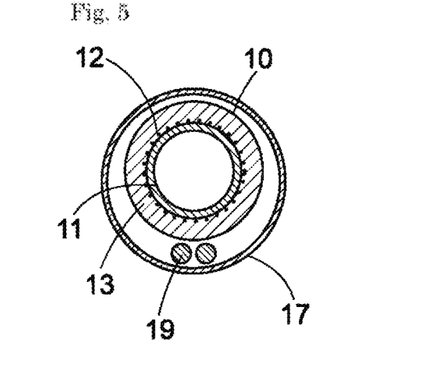
FIG. 5 is a sectional view taken along line V-V indicated in FIG. 4.
Figure 6:
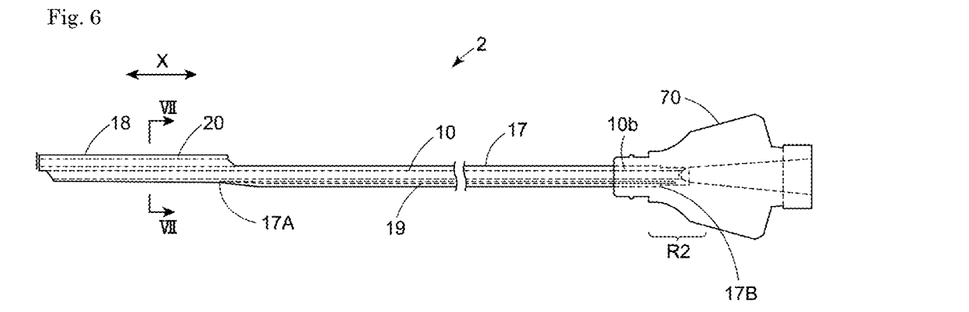
FIG. 6 is a side view of a catheter according to another embodiment.
Figure 7:
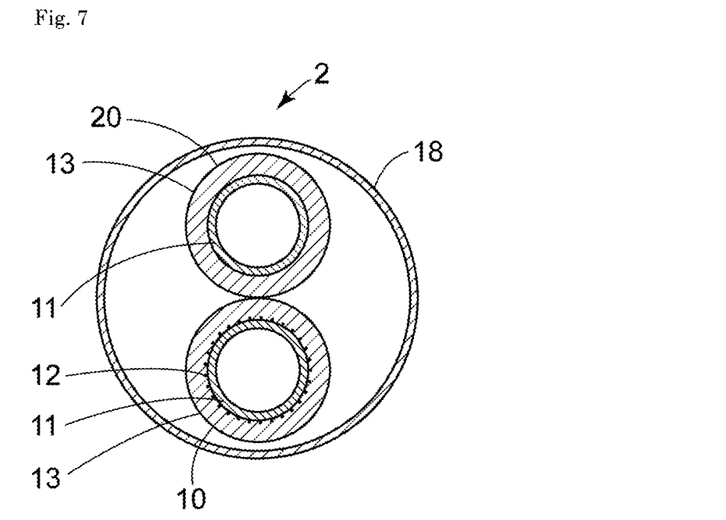
FIG. 7 is a sectional view taken along line VII-VII indicated in FIG. 6.

Description is made next to a catheter according to the other embodiment of the present invention with reference FIGS. 4 to 7. FIG. 4 is a partial enlarged view of a region R2 indicated in FIG. 6. FIG. 5 is a sectional view taken along line V-V indicated in FIG. 4. FIG. 6 is a side view of the catheter according to the other embodiment. FIG. 7 is a sectional view taken along line VII-VII indicated in FIG. 6. In each of these figures, elements denoted by reference signs identical to the reference signs included in FIGS. 1 to 3 are similar to the elements depicted in FIGS. 1 to 3, and will not be described repeatedly where appropriate.

As depicted in FIG. 6, the catheter 2 according to the other embodiment includes the tubular member 10 extending in the longitudinal direction X, and the handle 70 connected to the proximal end portion 10b of the tubular member 10.

As depicted in FIGS. 4 to 6, the catheter 2 further includes an outer tubular member 17 having an inner diameter larger than an outer diameter of the tubular member 10, extending in the longitudinal direction X, and having a distal end 17A and a proximal end 17B. The outer tubular member 17 has a lumen provided with the tubular member 10. The catheter 2 has a so-called double tube structure (coaxial structure) including the tubular member 10 and the outer tubular member 17 disposed coaxially with each other.

In the catheter 2 depicted in FIG. 4, the first lumen 71 of the handle 70 has a stepped portion with a larger distal diameter. This facilitates fixture into the first lumen 71, of a proximal end portion of the double tube structure (coaxial structure) of the catheter 2. Even in the case where the proximal end portion of the double tube structure (coaxial structure) is fixed into the first lumen 71, the first lumen 71 may have a cylindrical shape with a substantially constant diameter in the longitudinal direction X as depicted in FIG. 2.

As depicted in FIG. 4, the handle 70 may optionally have a through hole 74 for fluid injection allowing communication from an outer surface of the handle 70 to the first lumen 71. This configuration enables injection, via the through hole 74, of heated fluid or disinfectant fluid into the lumen of the outer tubular member 17 for sterilization. The handle 70 may optionally have a through hole 75 for adhesive injection allowing communication from the outer surface of the handle 70 to the first lumen 71. This configuration allows the adhesive 73 to be externally injected for fixture of the unreinforced portion 15 or the like.

The outer tubular member 17 has an outer surface that may be fixed to the first lumen 71 by the adhesive 73 as depicted in FIG. 4. The outer tubular member 17 has a proximal end portion that is preferably unsealed by the adhesive 73 in this case. This configuration enables injection of heated fluid or disinfectant fluid into the lumen of the outer tubular member 17 for sterilization as described above.

The outer tubular member 17 is not necessarily fixed into the first lumen 71 by means of the adhesive 73 as depicted in FIG. 4. Alternatively, the adhesive 73 may be applied to the outer surface at a distal end portion of the handle 70 to fix the outer tubular member 17 at a position outside the first lumen 71. In this case, the outer tubular member 17 is preferably unfixed by means of the adhesive 73 in the first lumen 71. This configuration facilitates improvement in production work efficiency.

As depicted in FIGS. 6 and 7, the catheter 2 may optionally include another tubular member 20 disposed radially adjacent to the tubular member 10. In this case, the distal end of the tubular member 10 is preferably positioned proximally beyond a distal end of the other tubular member 20, and the proximal end of the tubular member 10 is preferably positioned proximally beyond a proximal end of the other tubular member 20.

As depicted in FIG. 7, the other tubular member 20 preferably includes an inner layer 11 and an outer layer 13. The inner layer 11 and the outer layer 13 may optionally interpose a reinforcing member 12. As to configurations of these elements, reference can be made to the inner layer 11, the reinforcing member 12, and the outer layer 13 of the tubular member 10.

As depicted in FIGS. 6 and 7, the catheter 2 preferably includes another outer tubular member 18 disposed in a distal portion of the tubular member 10, and the tubular member 10 and the other tubular member 20 are preferably disposed in a lumen of the other outer tubular member 18.

The outer tubular member 17 and the other outer tubular member 18 preferably contain at least one selected from a group consisting of polyethylene, polyamide elastomer, polyamide, and polyurethane. Among these, more preferred is at least one selected from a group consisting of polyamide elastomer, polyamide, and polyurethane, and polyamide is further preferred. The outer tubular member 17 preferably contains a material identical to a material for the other outer tubular member 18. Furthermore, the distal end of the outer tubular member 17 and a proximal end of the other outer tubular member 18 are preferably integrated with each other.

The outer tubular member 17 preferably contains fine particles in a portion fixed by the adhesive 73 or the like. Description of the outer layer 13 can be referred to as to the fine particles.

The outer tubular member 17 preferably contains a barium salt in a portion positioned in the first lumen 71. Description of the outer layer 13 can be referred to as to the barium salt.

The tubular member 10 and the outer tubular member 17 preferably interpose a metal reinforcing wire 19 having a linear shape in the axial direction of the tubular member 10. This configuration can improve strength of the tubular member 10 and the outer tubular member 17. The metal reinforcing wire 19 may include a single wire, or two or more wires. The metal reinforcing wire 19 may have a cylindrical shape from a proximal side to a distal side, or a distally tapered shape. The metal reinforcing wire 19 is preferably provided at least from a distal position beyond the proximal end 14B of the reinforced portion 14 of the tubular member 10 to the proximal end of the other tubular member 20. The metal reinforcing wire 19 is made of a material exemplified by stainless steel, nickel-titanium, cobalt-chrome, or the like.

The proximal end 17B of the outer tubular member 17 is preferably positioned distally beyond the proximal end 14B of the reinforced portion 14 as depicted in FIG. 4. This configuration enables fixture of the outer surface of the reinforced portion 14 by the adhesive 73 or the like and facilitates improvement in fixing force.

The catheter 2 is appropriately used for treatment to expand a stenosed or obstructed part of a passage such as a blood vessel in a body. The catheter 2 is appropriately used to execute percutaneous coronary intervention (PCI) particularly for a furcation lesion at a coronary artery blood vessel or the like. Assume an exemplary case where the furcation of the coronary artery blood vessel has a stenosed part. In this case, while a wire is inserted to the other tubular member 20 and the catheter 2 is guided to a distal position beyond a start point of the furcation in a blood vessel stem, the tip-end bent wire 50 can be inserted to the stenosed part at the furcation through the tubular member 10, in order for search for an entrance of the stenosed part or to allow the wire to penetrate the stenosed part. Assume another case where the blood vessel stem has a stenosed part. In this case, while a wire is inserted to the other tubular member 20 and the catheter 2 is guided into the furcation, the tip-end bent wire 50 can be inserted to the stenosed part in the blood vessel stem through the tubular member 10, in order for search for the entrance of the stenosed part or to allow the wire to penetrate the stenosed part.

The present invention further includes a method of producing a catheter. The method of producing the catheter according to the present invention includes: covering a first end portion of a tubular body including a reinforcing member with a first end portion of a resin sleeve; and heating a metal body having a tapered portion and inserting the metal body from a second end portion of the resin sleeve toward the first end portion.

Figure 8:
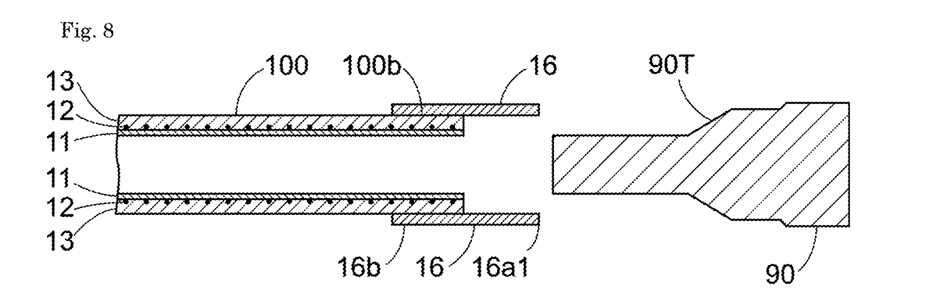
FIG. 8 is a sectional view indicating a step of producing the catheter according to the embodiment.
Figure 9:
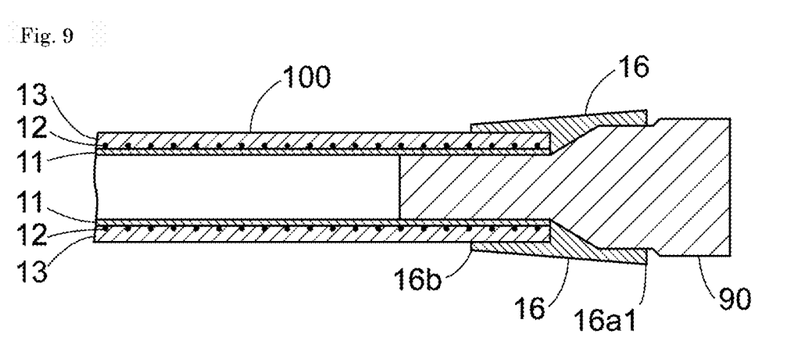
FIG. 9 is a sectional view indicating another step of producing the catheter according to the embodiment.

Description is made hereinafter to a method of producing the catheter 1 according to the embodiment of the present invention with reference FIGS. 8 and 9. FIGS. 8 and 9 are sectional views each depicting a step of producing the catheter 1 according to the embodiment. In each of these figures, elements denoted by reference signs identical to the reference signs in FIGS. 1 to 7 are similar to the elements depicted in FIGS. 1 to 7, and will not be described repeatedly where appropriate.

As depicted in FIG. 8, the method of producing the catheter 1 according to the embodiment includes covering a first end portion 100*b* of a tubular body 100 including the reinforcing member 12 with a first end portion 16*a*1 of the resin sleeve 16. During the covering, an axial coverage length is preferably twice or more and 35 times or less an inner diameter at a position apart by 1 mm distally from the first end portion 100*b* of the tubular body 100.

As depicted in FIG. 9, the method of producing the catheter 1 according to the embodiment includes heating a metal body 90 having a tapered portion, and inserting the metal body 90 from a second end portion 16*b* of the resin sleeve 16 toward the first end portion 16*a*1. It is difficult to form a tapered portion in a portion including the reinforcing member 12. The resin sleeve 16 is made of a resin and does not include the reinforcing member 12, so that the tapered portion can be easily formed with use of the metal body 90 thus heated. There is provided a stepped portion between a lumen of the tubular body 100 and a lumen of the resin sleeve 16 in the state depicted in FIG. 8. When the metal body 90 thus heated is inserted, an inner wall of the resin sleeve 16 is melted by heat and flows to bury a gap, so as to eliminate or reduce the stepped portion as depicted in FIG. 9. Furthermore, when the metal body 90 thus heated is inserted, the inner wall of the resin sleeve 16 is melted by heat to be fixed to an outer circumferential surface of the first end portion 100*b* of the tubular body 100.

Subsequently, an adhesive or the like is applied to the tubular body 100, an outer circumferential surface of the resin sleeve 16, and the like, and the unreinforced portion 15 is disposed in the first lumen 71 of the handle 70 to be fixed such that the proximal end 15B of the unreinforced portion 15 is positioned at the proximal end 71B of the first lumen 71 as depicted in FIGS. 1 and 2. As depicted in FIG. 4, the unreinforced portion 15 may be fixed alternatively by preliminarily providing the handle 70 with the through hole 75 for adhesive injection and injecting an adhesive through the through hole 75.

The present application claims benefit of priority based on Japanese Patent Application No. 2019-114064 filed on Jun. 19, 2019. The entire content of the specification of Japanese Patent Application No. 2019-114064 filed on Jun. 19, 2019 is incorporated in the present application by reference.

DESCRIPTION OF REFERENCE SIGNS

1 catheter according to an embodiment
2 catheter according to another embodiment 10 tubular member
10A distal end of tubular member
10B proximal end of tubular member
10b proximal end portion of tubular member
11 inner layer
12 reinforcing member
13 outer layer
14 reinforced portion
14B proximal end of reinforced portion
14C position apart by 1 mm distally from proximal end of reinforced portion
14b1 proximal end portion of reinforced portion
15 unreinforced portion
15B proximal end of unreinforced portion
15T tapered portion of unreinforced portion
16 resin sleeve
16A distal end of resin sleeve
16a1 first end portion of resin sleeve
16b second end portion of resin sleeve
17 outer tubular member
17A distal end of outer tubular member
17B proximal end of outer tubular member
18 other outer tubular member
19 metal reinforcing wire
20 other tubular member
50 tip-end bent wire
70 handle
71 first lumen
72 second lumen
71B proximal end of first lumen
72A distal end of second lumen
72T tapered portion of second lumen
73 adhesive
74 through hole for fluid injection
75 through hole for adhesive injection
90 metal body having tapered portion
100 tubular body
100b first end portion of tubular body

The invention claimed is:

1. A catheter comprising:
a tubular member extending in a longitudinal direction and having a distal end and a proximal end;
a handle connected to a proximal end portion of the tubular member; and
an adhesive, wherein
the tubular member has a reinforced portion including a reinforcing member, and an unreinforced portion including no reinforcing member, the unreinforced portion being positioned at a proximal side of the reinforced portion,
the unreinforced portion is fixed within the handle via the adhesive,
the unreinforced portion has a lumen having a tapered portion, an inner diameter of which is increased in the longitudinal direction toward the proximal end,
the handle has a first lumen, and a second lumen positioned at a proximal side of the handle,
an inner diameter of the first lumen at a proximal end is larger than an inner diameter at a distal end of the second lumen of the handle,
the tubular member and the handle are disposed such that the unreinforced portion is fixed to the first lumen, a proximal end of the unreinforced portion is positioned at the proximal end of the first lumen, and the catheter satisfies formulae (1) to (3):

$$a<b \quad (1)$$
$$a<c \quad (2)$$
$$b \geq c \quad (3)$$

where a is an inner diameter at a position apart by 1 mm distally from a proximal end of the reinforced portion of the tubular member, b is an inner diameter at the proximal end of the unreinforced portion of the tubular member, and c is the inner diameter at the distal end of the second lumen of the handle.

2. The catheter according to claim 1, wherein the second lumen of the handle has a tapered portion, an inner diameter of which is reduced in the longitudinal direction toward the distal end.

3. The catheter according to claim 1, further comprising a resin sleeve, the sleeve covering an outer surface of a proximal end portion of the reinforced portion and extending in the longitudinal direction toward a proximal end of the handle to constitute the tapered portion of the unreinforced portion.

4. The catheter according to claim 3, wherein an axial length from the proximal end of the reinforced portion to a distal end of the sleeve is twice or more and 35 times or less the inner diameter a at the position apart by 1 mm distally from the proximal end of the reinforced portion of the tubular member.

5. The catheter according to claim 3, wherein the sleeve comprises a thermoplastic resin.

6. The catheter according to claim 5, wherein the thermoplastic resin is at least one resin selected from a group consisting of polyethylene, polyamide elastomer, polyamide, and polyurethane.

7. The catheter according to claim 1, wherein the proximal end portion of the tubular member is fixed to the first lumen by the adhesive.

8. The catheter according to claim 7, wherein the adhesive is at least one adhesive selected from a group consisting of a cyanoacrylate adhesive, an acrylic adhesive, an epoxy adhesive, and a urethane adhesive.

9. The catheter according to claim 1, further comprising an outer tubular member having an inner diameter larger than an outer diameter of the tubular member, extending in the longitudinal direction, and having a distal end and a proximal end, wherein
the outer tubular member has a lumen, in which the tubular member is disposed.

10. The catheter according to claim 9, wherein the tubular member is disposed in the lumen of the outer tubular member such that the proximal end of the reinforced portion of the tubular member extends beyond the proximal end of the outer tubular member.

11. The catheter according to claim 1, wherein the reinforcing member is a braided body made of braided wires, or a coil made of a spirally wound wire.

12. The catheter according to claim 1, wherein the reinforced portion includes an inner layer and an outer layer, and the reinforcing member is interposed between the inner layer and the outer layer.

13. The catheter according to claim 12, wherein the outer layer contains at least one material selected from a group consisting of polyethylene, polyamide elastomer, polyamide, and polyurethane.

14. A method of producing the catheter of claim 1, the method comprising:
covering the proximal end portion of the tubular member including the reinforcing member with a distal end portion of a resin sleeve;

heating a metal body having a tapered portion and inserting the metal body from a proximal end portion of the resin sleeve toward the distal end portion so that the resin sleeve is formed into the unreinforced portion having the lumen having the tapered portion;

applying the adhesive to an outer circumferential surface of the unreinforced portion; and disposing the unreinforced portion in the first lumen of the handle so that the unreinforced portion is fixed within the handle via the adhesive.

\* \* \* \* \*